No Printed Specification Available
9879X
F. P. KNOWLTON.
FEATHER DRESSER.
Patented July 2, 1836.
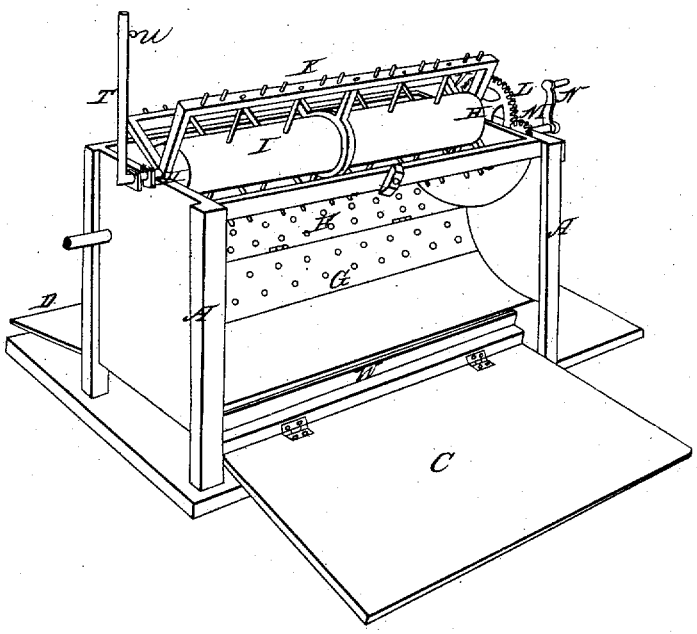
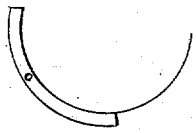
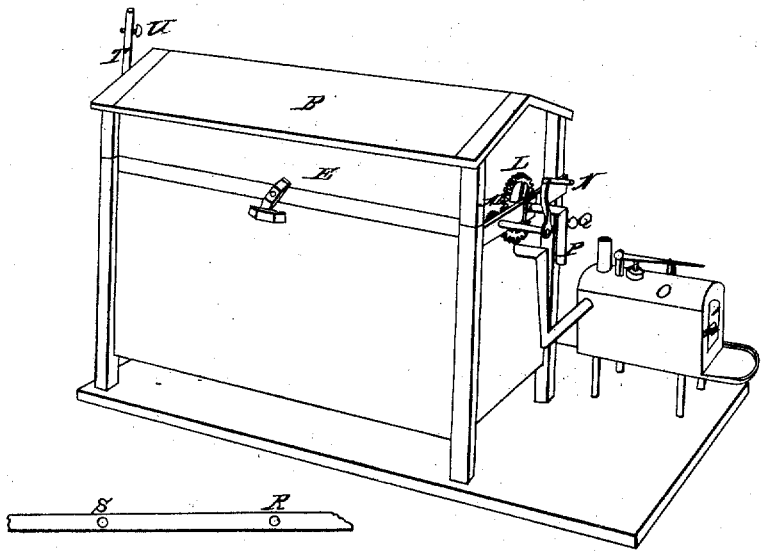
THE NORRIS PETERS CO., PHOTO-LITHO., WASHINGTON, D. C.

9879X July 2. 1836

Francis P. Knowlton of the town of Claremont in the county of
Sullivan and State of New Hampshire
Letters Patent

---

The schedule referred to in these Letters Patent, and making
part of the same, containing a description in the words of the
said Francis P. Knowlton himself of his Improvement in the
Steam Feather Dresser

---

Be it known, that I, Francis P. Knowlton of the town
of Claremont, in the county of Sullivan and State of New-
Hampshire have invented a new and useful improvement in
the machine for dressing feathers, called Knowlton's improved
Steam Feather Dresser — which is described as follows, refe-
rence being had to the annexed drawings of the same, making
part of the Specification —

This machine consists of a frame A about 7 feet long 4 feet wide
and 6 feet high, composed of four posts, side and end pieces enclosed
all around with thin boards forming a tight case for the feathers
except a space in the top for their introduction which is covered
with cloth B and two round apertures in the ends for the ends of
the hollow shaft hereafter described to turn in —

One side C of the case opens on hinges for taking out the feathers.
The other side D likewise opens on hinges for removing the Pan
hereafter described — The case or box is made in two parts so that
the upper part E can be removed to obtain access to the interior —
The top of the case is made in an obtuse the shape of an obtuse
angle, one half of which is covered with a cloth as before mention'd.
Near the centre of the case is constructed a semi circular metal
lic concave F to hold the feathers pierced with apertures for the
escape of dirt &c. through to the pan below one side O of which
concave turns on hinges and opens for the discharge of the feathers.
Through the centre of the case extends a hollow shaft F2 whose ends turn in the apertures before mentioned in the ends of the case -
Around this shaft is formed a hollow Cylinder I into which the Steam
is introduced for heating the feathers and over this Cylinder is con-
structed a reel K or stirrer for agitating the feathers which reel is
fastened to the Cylinder and turns with it by means of a cogwheel
L fastened on the end of the hollow shaft into which is geared a pinion
M turned by a crank N - The Steam is introduced from a boiler
O into the hollow shaft by a pipe P furnished with a stopcock Q
to regulate it, and from the hollow shaft it passes into the hollow
Cylinder through an aperture R in the shaft, and back again into
the shaft through another aperture S and from thence it passes
out of the machine through a pipe T at the other end of the case
furnished also with a cock U to regulate it -

There is a cock V near one end of the Cylinder for drawing off
the condensed Steam - A pan W before mentioned or vessel to
receive the dirt extracted from the feathers is placed below the
concave -

The steam being raised and let into the Cylinder
through the hollow shaft, the feathers are put into the case (in
the concave) sprinkled with a solution of chloride of lime and
water - The crank is then turned which turns the hollow shaft
Cylinder and reel - The reel serving to agitate the feathers
and keep them in continual motion - After remaining in
the machine till quite dry which will be known by the cloth
on the top becoming dry, the side of the case is to be opened and the
door of the concave turned down which will discharge the feathers
completely cleansed and having the appearance of new feathers.

The hollow shaft and Cylinder may be dispensed with
and a heater formed for heating the feathers by placing a pa-
rallel lining around one half of the concave at such distance
from it as to leave a space between them large enough for
steam sufficient to heat the interior of the case to the degree re-
quired, the steam being admitted at one end and discharged
at at the other

What I claim as my invention and which I desire to secure by Letters Patent consists in the combination and arrange-ment of the several parts of the Machine as before described for dressing feathers, particularly in the manner of introducing & discharging them: and also in the manner of heating the feathers by means of steam introduced between the side of the concave and the lining surrounding it in the manner here described.— I make no claim to the use of a hollow shaft, cylinder or reel.

Witnesses.
Wm. P. Elliot
Saml. Stettinius

Francis P. Knowlton

959 [illegible] Drawing

[illegible]